(12) United States Patent
Gall

(10) Patent No.: US 8,876,122 B2
(45) Date of Patent: Nov. 4, 2014

(54) LEVEL CONTROL FOR VEHICLES HAVING AT LEAST ONE AIR SPRING

(71) Applicant: AMK Arnold Müller GmbH & Co. KG, Kirchheim/Teck (DE)

(72) Inventor: Thomas Gall, Ohmden (DE)

(73) Assignee: AMK Arnold Müller GmbH & Co. KG, Kirchheim/Teck (DE)

( * ) Notice: Subject to any disclaimer, the term of this patent is extended or adjusted under 35 U.S.C. 154(b) by 0 days.

(21) Appl. No.: 13/902,338

(22) Filed: May 24, 2013

(65) Prior Publication Data
US 2013/0320645 A1 Dec. 5, 2013

(30) Foreign Application Priority Data
May 29, 2012 (DE) .......................... 10 2012 010 390

(51) Int. Cl.
| | |
|---|---|
| *B60G 17/015* | (2006.01) |
| *B60G 17/052* | (2006.01) |
| *B60G 17/056* | (2006.01) |
| *B60G 17/08* | (2006.01) |
| *B60G 11/27* | (2006.01) |

(52) U.S. Cl.
CPC .......... *B60G 17/08* (2013.01); *B60G 2500/201* (2013.01); *B60G 17/056* (2013.01); *B60G 11/27* (2013.01)
USPC ... 280/5.514; 180/41; 280/6.157; 280/124.16

(58) Field of Classification Search
USPC ................ 180/41; 280/5.514, 6.157, 124.16; 701/37
See application file for complete search history.

(56) References Cited

U.S. PATENT DOCUMENTS

| | | | | |
|---|---|---|---|---|
| 4,611,815 | A | * | 9/1986 | Sasage et al. ............... 280/6.159 |
| 4,799,707 | A | * | 1/1989 | Buma et al. ............ 280/124.161 |
| 4,826,141 | A | * | 5/1989 | Buma et al. ............... 267/64.28 |
| 4,856,798 | A | * | 8/1989 | Buma et al. ................ 280/5.507 |
| 4,881,753 | A | * | 11/1989 | Shima et al. ............... 280/6.157 |

* cited by examiner

*Primary Examiner* — Joseph M Rocca
*Assistant Examiner* — Laura Freedman
(74) *Attorney, Agent, or Firm* — Roylance, Abrams, Berdo & Goodman LLP (57) ABSTRACT

A level control for vehicles has at least one air spring cushioning a vehicle body relative to a vehicle axle. A compressed air generator is connected to the air spring by an air dryer and to the atmosphere by a check valve opening in the intake direction of the generator. The air spring can be connected to the atmosphere for discharge via a pneumatically controllable first directional valve. The air spring pressure is applied to a pneumatic control input of the first directional valve via a second controllable directional valve. The input of the first directional valve can be connected to the atmosphere for ending discharge of the spring. A line with a compressed air accumulator branches off from the air spring supply line via a first changeover valve. The accumulator is connected to the intake side of the generator via a second changeover valve.

22 Claims, 5 Drawing Sheets

LEVEL CONTROL FOR VEHICLES HAVING AT LEAST ONE AIR SPRING

FIELD OF THE INVENTION

The invention relates to a level control arrangement for vehicles having at least one air spring. A compressed air generator can be connected to the air spring by an air dryer and to the atmosphere by a check valve that opens in the intake direction of the compressed air generator. The air spring can be connected to the atmosphere for discharging via the air dryer and a pneumatically controllable first directional valve. The pressure in the air spring is applied to a pneumatic control input of the first directional valve via a second electrically controllable directional valve against a reset force that acts on the pneumatic control input. The pneumatic control input of the first directional valve can be connected to the atmosphere via a second directional valve to end a discharge process of the air spring.

BACKGROUND OF THE INVENTION

Level control arrangements of this kind known in the art use the air from a pressure accumulator for controlling ride height. A compressed air generator fills this pressure accumulator typically to an air pressure of ca. 20 bar. However, for reasons of air spring/vehicle kinematics, only a pressure of ca. 10 bar can be applied to the air springs. The needed operating pressure of the air spring then corresponds to the pressure in the compressed air accumulator, such that a flow from that accumulator to the air spring is no longer possible. An unused residual pressure is left behind in the compressed air accumulator. To be able to raise a vehicle in this state, it would be necessary to increase the pressure in the compressed air accumulator or lift the vehicle directly by the compressed air generator. Both solutions considerably increase the length of time required for a level change of the vehicle in comparison to the direct lifting action by a supply from the compressed air accumulator, a fact that must be evaluated as a disadvantage.

SUMMARY OF THE INVENTION

An object of the present invention is to provide an improved level control arrangement that allows for a substantial increase of the lift speeds, accompanied by higher overall effectiveness and better energy efficiency, and that provides for, in as much as possible, uniform power consumption over the complete operating range with regard to the drive motor of the compressed air generator. The drive motor can be an electric motor, resulting in a considerably reduced load to the onboard power supply of the vehicle.

The object is basically achieved with a level control arrangement for vehicles according to the invention having a first line branched off from a supply line of the air spring via a first changeover valve. The compressed air accumulator is connected via a second changeover valve. A line is connected to the compressed air path between the check valve and the compressed air generator, to the intake side of the compressed air generator. This line contains a preferably pneumatically operating pressure controller. This pressure controller can be preferably permanently adjusted or can be readjusted relative to the system pressure in the supply line of the air spring.

Advantageously, when the vehicle body can be raised by the compressed air generator, the second changeover valve is moved from its closed position into its opened position. Compressed air is removed from the compressed air accumulator by the pressure controller supplied with a closed check valve of the intake side of the compressed air generator. The compressed air generator increases the pressure of the compressed air that is, for example, permanently preset. This compressed air is supplied via the air dryer to the air spring.

The invention further relates to a method for providing a level control.

The invention provides for the possibility of raising a vehicle with at least one air spring, initially by compressed air taken from the compressed air accumulator. When, for example, the compressed air level of the compressed air accumulator is no longer sufficient, a vehicle can be raised by the compressed air generator. The compressed air generator is efficiently preloaded, via the second changeover valve and the pressure controller, to the pressure level that is still available in the compressed air accumulator. This way, upon being switched on, the compressed air generator, that must deliver compressed air of a higher pressure, already starts up with a substantial starting pressure due to the preloading. This preloading helps to visibly increase the lift speeds. Simultaneously, the power consumption of the electric drive motor of the compressed air generator remains almost unchanged over the operating range "lifting with compressed air generator." In contrast to the known systems, the present apparatus offers higher overall effectiveness and better energy efficiency. Improved noise properties are achieved by a constant speed level of the electric motor that powers the compressed air generator. The constant power consumption is a further advantageous aspect, wherein a lower load to the onboard network of the vehicle is detected. With a corresponding characteristic of the pressure controller, the preload of the performance of the compressor's electric motor can be tracked. Correspondingly, the compressed air generator operates with a preload that depends on the system pressure across a very wide operating range with optimal pneumatic and electrical effectiveness. Depending on the compressor concept, this characteristic can look as follows: high system pressure=low pressure of the preload or low system pressure=high pressure of the preload, respectively; or, however, high system pressure=high pressure of the preload or low system pressure=low pressure of the preload, respectively.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

FIGS. 1 to 5 depict a compressed air supply device 10 provided, in particular, for vehicles. This compressed air device 10 can be utilized in varied ways in vehicles. In the drawings, the device is only represented in an exemplary manner in the form of a level control arrangement for motor vehicles and will be explained as such in further detail below. The compressed air supply device 10 is configured, in particular, for at least one air spring, for a vehicle body (not shown in further detail), cushioned with regard to at least one vehicle axle (not shown). The illustrated example provides for the use of four air springs; one single air spring 11 is subsequently referred to in place of all remaining three air springs. Each air spring 11 is connected to a pressure line 12 that contains an electrically controllable 2/2 directional valve 13. The control input of each valve 13 is connected, via a control line 14, to a control device 15. The pressure line 12 is connected to a pressure line 16 that is shared by all four air springs and serves as a supply line for them.

The compressed air supply device 10 includes a compressed air generator 17 in the form of a compressor that includes a motor/pump unit. Generator 17 is connected on its intake side with a pressure line 18 that contains a check valve 19 that opens in the suction direction toward the compressed air generator 17 and closes in the opposite direction by a spring load. A pressure line 20 is connected to the pressure side of the compressed air generator 17 and contains an air dryer 21 having an output that is, for example, connected with the pressure line 16 via a choke.

Figure 3:
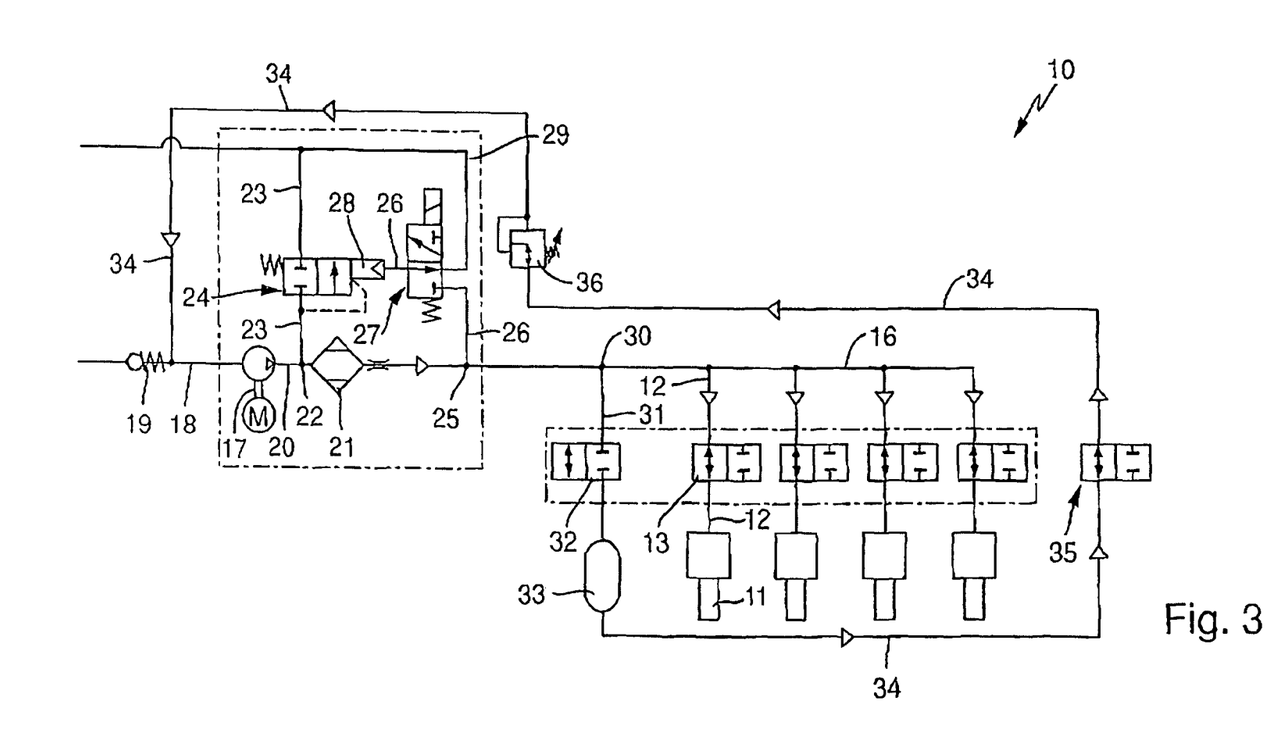
FIG. 3 is a schematic diagram of the level control arrangement of FIG. 1 in a third operating phase.
Figure 4:
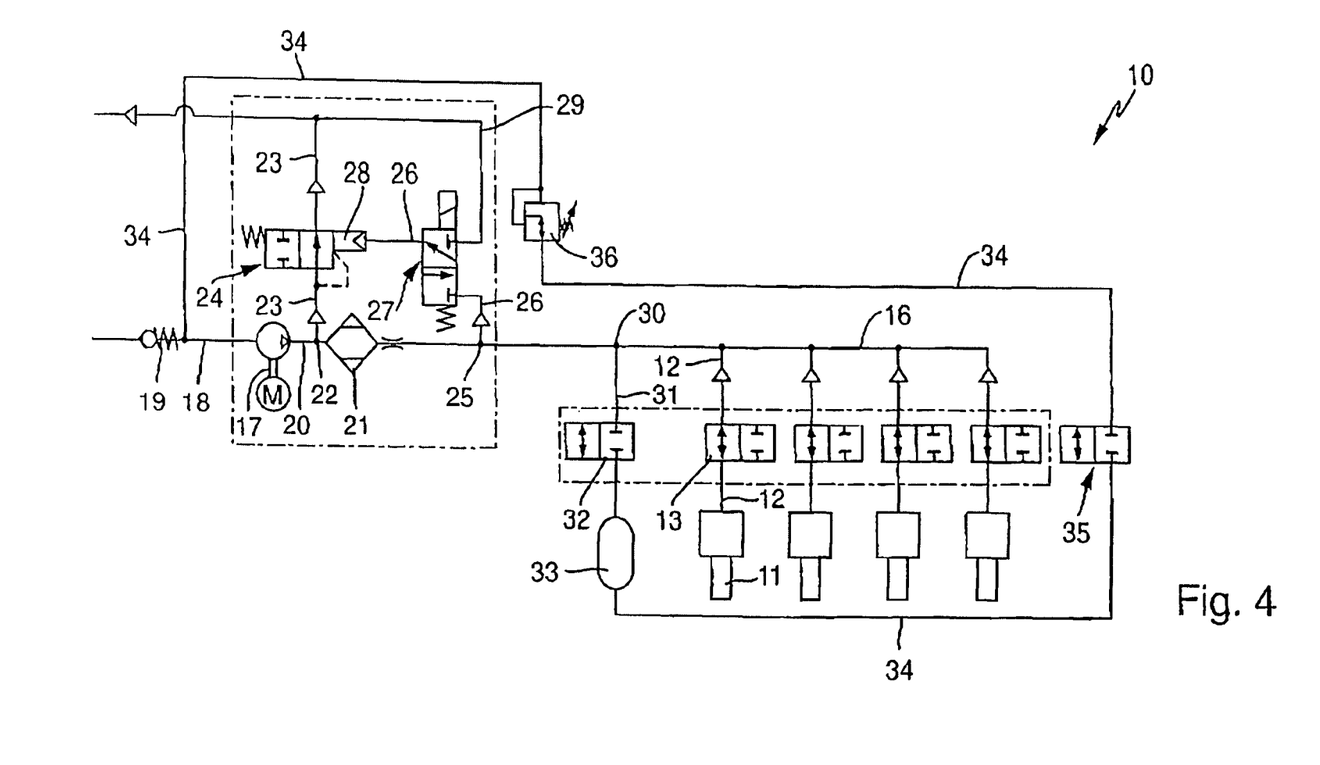
FIG. 4 is a schematic diagram of the level control arrangement of FIG. 1 in a fourth operating phase.

A pressure line 23 branches off from the pressure line 20 at 22 between the compressed air generator 17 and the air dryer 21. Line 23 contains a pneumatically controllable 2/2 directional valve 24 and transitions to the atmosphere after this valve 24. In the first switching state of the valve 24 as shown in FIGS. 1, 2, 3 and 5, the pressure line 23 is blocked from the atmosphere. In the second switching state of the valve 24, as shown in FIG. 4, the pressure line 23 is connected to the atmosphere.

A pressure line 26 branches off at 25 in the flow direction downstream of the air dryer 21, which has an electrically controllable 3/2 directional valve 27 disposed therein. By valve 27, the pressure line 26 is connected to the pneumatic control input 28 of the directional valve 24. In the first switching state of the electrically controllable directional valve 27 shown in FIGS. 1, 2, 3 and 5, the pneumatic control input 28 of the directional valve 24 is connected to the atmosphere by the directional valve 27 via a connection line 29. In the second switching state of the directional valve 27 that is depicted in FIG. 4, the pressure line 26 is, in contrast, switched through such that the pressure line 26 routes the pressure, which is branched off by the pressure line 16 via the branch-off 25, to the pneumatic control input 28. The directional valve 24 is then brought into a second switching state thereof, in which, by this valve 24, the pressure line 23 is switched through to the atmosphere. The air pressure can also escape into the atmosphere by the air dryer 21, up to the preset pressure level. The air dryer 21 is regenerated during this step. The compressed air generator 17 is without function therein.

Figure 5:
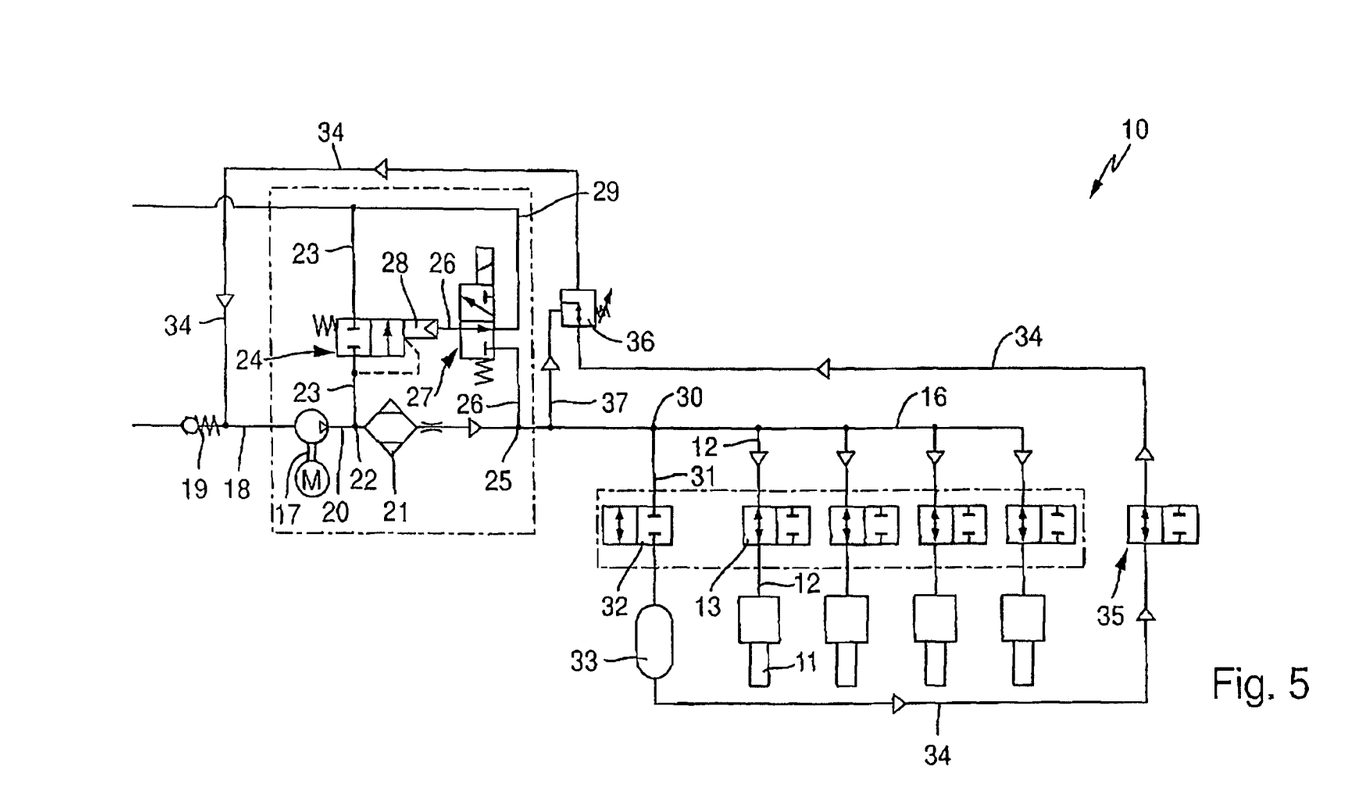
FIG. 5 is a schematic diagram of a level control arrangement according to a second exemplary embodiment of the invention.

A pressure line 31 branches off, upstream of the branch-off of the respective pressure line 12 at the branch-off 30, from the pressure line 16, which line 16 is the supply line of the air springs 11, and in which there is disposed a first changeover valve 32 in the form of an electrically controllable 2/2 directional valve. A compressed air accumulator 33 is contained inside this pressure line 31 downstream of the first changeover valve 32. Following the compressed air accumulator 33 is a pressure line 34 connected to the pressure line 18 in the area between the check valve 19 and the intake side of the compressed air generator 17. The pressure line 34 contains, downstream of the compressed air accumulator 33, a second changeover valve 35 in the form of an electrically controllable 2/2 directional valve and, additionally, a pressure controller 36. The second changeover valve 35 is, according to FIGS. 1, 2 and 4, in the first switching state in which this valve is closed such that the pressure controller 36 is without function. On the other hand, in the phase as depicted in FIGS. 3 and 5, the second changeover valve 35 is in the second switching state in which the pressure line 34 is switched through, such that the compressed air accumulator 33 is connected to or in fluid communication with the pressure line 18 and the uptake side of the compressed air generator 17. Via the pressure line 34, the open second changeover valve 35 and the pressure controller 36, the compressed air generator 17 is then preloaded with pressure from the compressed air accumulator 33. The compressed air generator 17 then increases the pressure that is provided by the pressure controller 36 and supplies, with the directional valve 13 of the air spring 11 in the respective open position thereof, the air spring with the pressure from the compressed air generator 17, via the pressure lines 16 and 12. In both phases according to FIG. 3 and FIG. 5, the compressed air generator 17 is thus functional in supplying the air spring 11. The compressed air generator 17 is preloaded, via the pressure line 34 and the pressure controller 36, by the compressed air accumulator 33.

In the first embodiment as depicted in FIGS. 1 to 4, the pressure controller 36 is adjusted to a preset permanent value. In the second embodiment according to FIG. 5, the pressure controller 36 is readjusted corresponding to the system pressure in the pressure line 16 of the air spring 11 and is connected via a line 37 to the pressure line 16 that serves as supply line. The pressure controller 36 preferably operates pneumatically.

Figure 1:
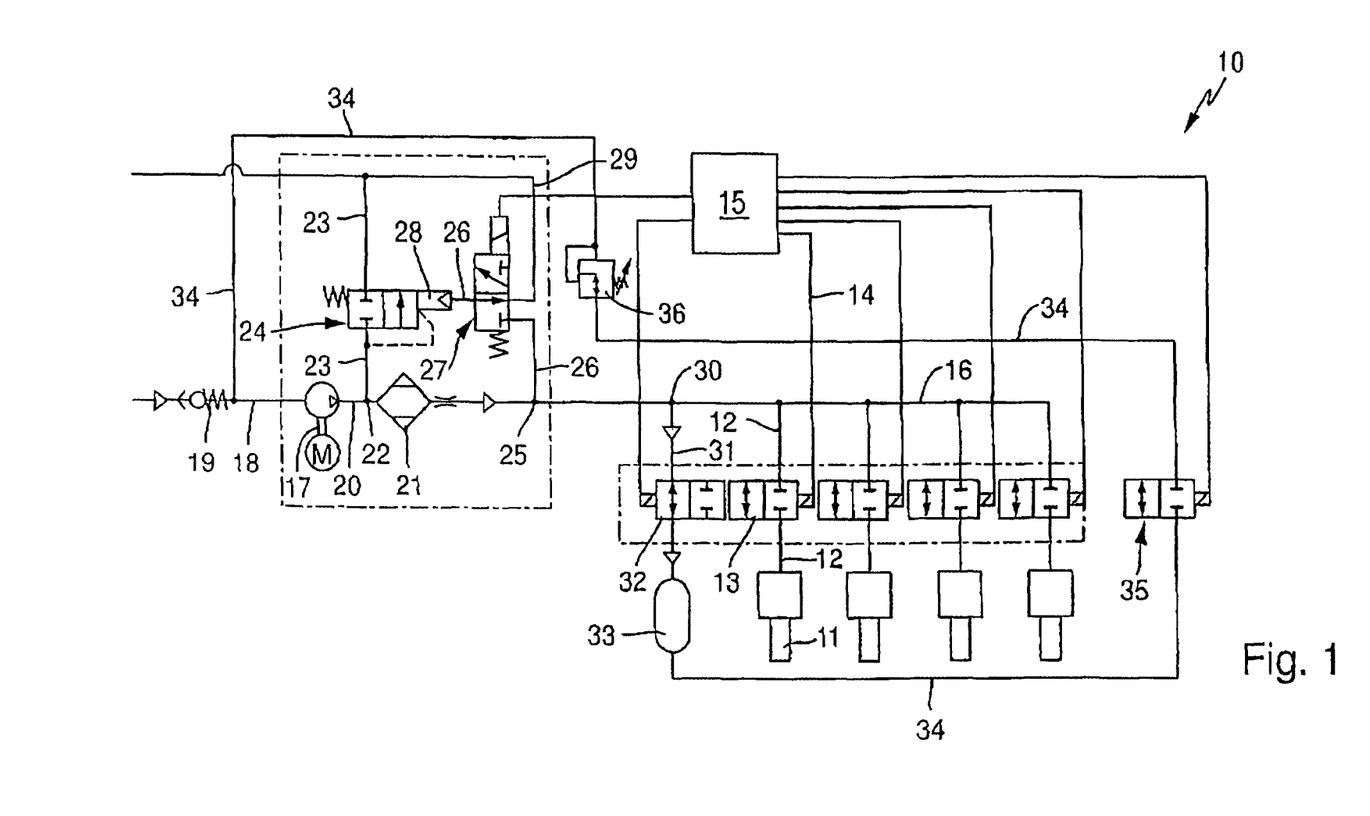
FIG. 1 is a schematic diagram of a level control arrangement in a first operating phase according to a first exemplary embodiment of the invention.

FIG. 1 depicts an operating state in which the compressed air accumulator 33 is filled and pressurized by the compressed air generator 17. To this end, using the control device 15, the first changeover valve 32 is triggered in the open position; the compressed air generator 17 is also triggered, such that the compressed air generator operates, taking in air from the atmosphere through check valve 19 and then condensing the air. The condensed air is routed through the pressure line 20 to the air dryer 21, where the condensed air is dehumidified. Via the pressure line 16 and branch-off 30, the compressed air reaches the pressure line 31 and the compressed air accumulator 33, into which the compressed air is transported, until the preset pressure level is reached.

Figure 2:
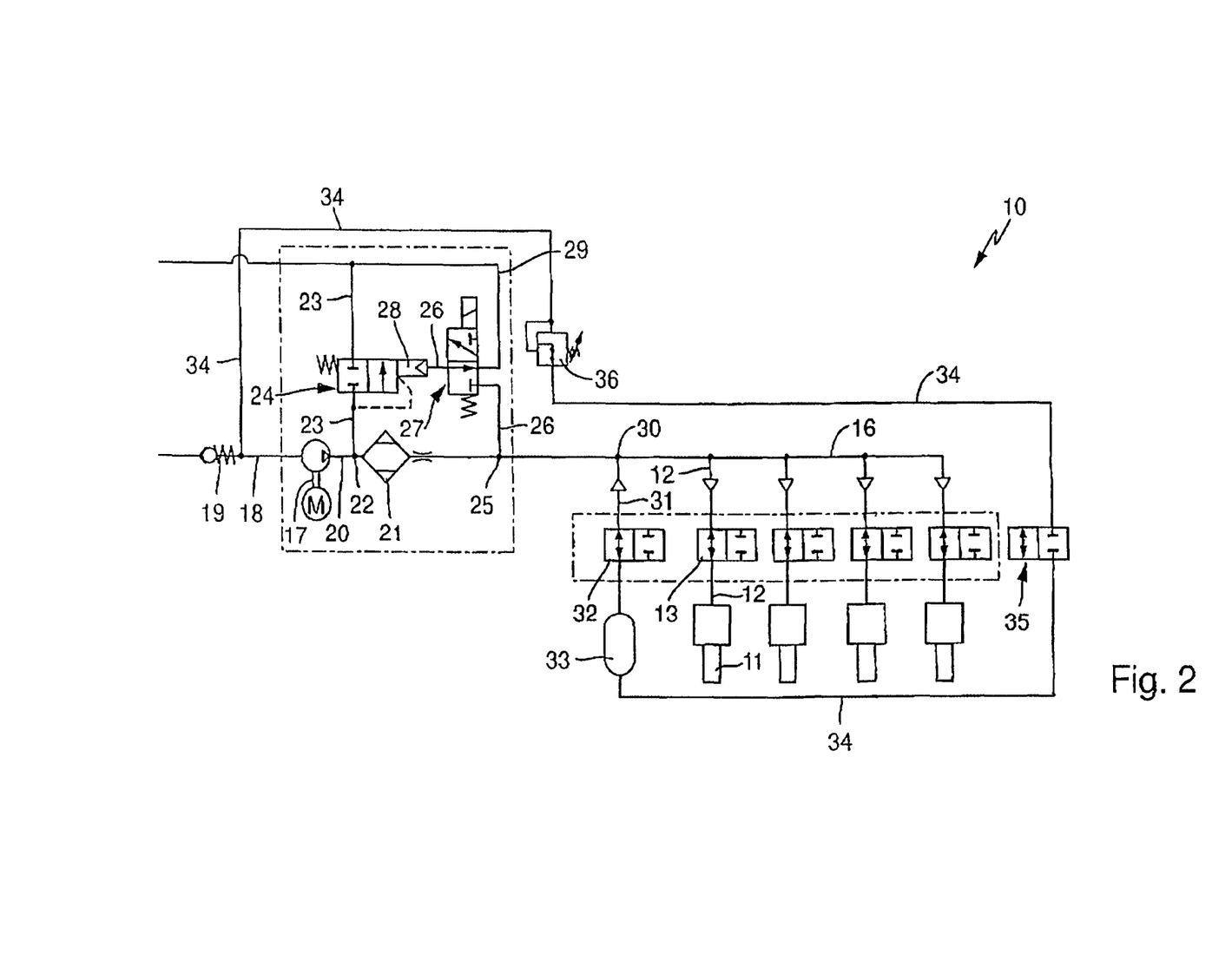
FIG. 2 is a schematic diagram of the level control arrangement of FIG. 1 in a second operating phase.

FIG. 2 depicts a switching state in which the air spring 11 is supplied with compressed air and the vehicle (not shown), is raised. This raising occurs by the compressed air that is stored in the compressed air accumulator 33. Deviating from FIG. 1, the compressed air generator 17 is not functional here. The first changeover valve 32 is triggered once again in the open position by the control device 15. The directional valve 13 in the pressure line 12 of the air spring is now also triggered in the open position. Compressed air contained in accumulator 33 can reach the air spring 11, opposite to the charging process of the compressed air accumulator 33, via the first changeover valve 32, the pressure line 16, the pressure line 12 and the open directional valve 13. The air that is stored in the compressed air accumulator 33 is thus routed into the air springs 11 until the preset pressure level is reached.

In the switching state as indicated in FIG. 3, the air spring 11 is also supplied with compressed air resulting in the air spring 11 raising the vehicle. To this end, by the control device 15, the first changeover valve 32 is moved to the first switching state, meaning the closed state. The directional valve 13 in the pressure line 12 of the air spring 11 is adjusted to the second switching state in which the directional valve 13 reaches the open state. In addition, the second changeover valve 35 is also transferred from the closed position to the open position thereof.

As a result, compressed air is supplied from the compressed air accumulator 33, via the pressure line 34, the open second changeover valve 35, the pressure controller 36 in the line 34, to the intake side of the compressed air generator 17. The compressed air generator 17 is then preloaded with this compressed air from the compressed air accumulator 33. The compressed air generator 17 is activated and increases the pressure provided and permanently adjusted by the pressure controller 36, with the check valve 19 is closed on the intake side. The pressure that was increased by the compressed air generator 17 is supplied to the pressure line 16 and from there, via pressure line 12 and the open directional valve 13, to the air spring 11. As a result, the vehicle is raised by the compressed air generator 17 with a preload of compressed air that was permanently adjusted by the pressure controller 36. In this context, the compressed air generator 17 must increase the compressed air level, starting from the level of the load of the compressed air accumulator 33 and the preload, only to such an extent as is necessary for raising the vehicle by the air spring 11. This system allows for substantially increasing the lift speeds. The times needed for level changes are shortened considerably. A residual pressure left behind in the compressed air accumulator 33, which pressure is insufficient for raising the air springs 11 and is normally left behind unused in the compressed air accumulator 33, is then utilized for preloading the compressed air generator 17.

The switching state as shown in FIG. 4 depicts the lowering action of the vehicle (not shown), accompanied by a release of the pressure into the atmosphere. The compressed air generator 17 is without function or not used during this step. The control device 15 controls the directional valves 13 of the air springs 11 to take their open position. The first changeover valve 32 and the second changeover valve 35 are in their closed positions. The directional valve 27 is adjusted to the second switching state by the control device 15, where the pressure line 26 is switched through in such a way that pressure is applied, via pressure lines 12, 16 and 26, to the pneumatic control input 28 of the first directional valve 24. The first directional valve 24 is then moved into the open position in which the pressure line 23 is switched through to the atmosphere. The applied pressure can then escape from the pressure spring 11 via the pressure lines 12, 16 and 23 into the atmosphere. During this, a flow passes through the air dryer 21 in the pressure line 16, whereby the air dryer is regenerated. The compressed air escapes through the air dryer 21 into the atmosphere until the preset pressure level is reached.

The switching state as indicated in FIG. 5 corresponds substantially to the switching state according to FIG. 3, wherein the compressed air generator 17 is preloaded from the compressed air accumulator 33 via the pressure line 34, the second changeover valve 35, the pressure controller 36 and the pressure line 34 that leads to the intake side of the compressed air generator 17. Preloading of the compressed air generator 17 that occurs is dependent on the system pressure therein, which pressure acts on the pressure controller 36 via the line 37. The pressure preload of the compressed air generator 17 depends on the system pressure. In this instance as well, the compressed air generator 17 fills the air spring 11, when an accumulator pressure in the compressed air accumulator 33 falls below a value that is no longer sufficient for increasing the pressure in the air spring 11. The intake pressure of the compressed air generator 17 does not correspond to the atmospheric pressure, as is the case with filling the compressed air accumulator 33 according to FIG. 1. Instead, the intake pressure is readjusted after the second changeover valve 35 has been opened by the pressure controller 36, analogously to the system pressure at the output of the compressed air generator 17. The arrangement operates with a variable preload of the compressed air generator 17. Advantageously, in the embodiment as depicted in FIG. 5, the preload of the performance characteristic of the compressed air generator 17 can be tracked, particularly of the compressor/electric motor, by a corresponding characteristic of the pressure controller 36. Accordingly, the compressor operates with a system-dependent preload across a very wide operating range with optimal pneumatic and electrical effectiveness. Depending on the compressor concept, this characteristic can look as follows: high system pressure=low pressure of preload or low system pressure=high pressure of preload; or, however, high system pressure=high pressure of preload or low system pressure=low pressure of preload, respectively. Using the described arrangement, a substantially higher overall level of effectiveness and energy efficiency can be achieved. Advantageously, when the arrangement is used in the vehicle, a clearly reduced, derivable load on the onboard network with constant power consumption is provided. Improved noise properties are the result of an achievable constant speed level of the compressed air generator 17 (compressor/electric motor). With all that, the arrangement is still simple and cost-effective. In terms of the control engineering, preloading the compressed air generator 17 for raising the vehicle is easily implemented.

The first changeover valve 32 can be moved from the closed position thereof to its open position for charging the compressed air accumulator 33 according to FIG. 1 by actuating the control device 15. Also, the first changeover valve 32 can be moved from its closed position thereof to its open position for raising the vehicle body from the compressed air accumulator 33, and the compressed air is routed from the compressed air accumulator 33 to the preset pressure level and/or lift level into the air spring 11.

For the vehicle to be raised by the compressed air generator 17, the second changeover valve 35 can be moved from its closed position into its open position, and compressed air is removed from the compressed air accumulator 33 via the changeover valve 35 and the pressure controller 36. That compressed air is supplied, with a closed check valve 19, via the pressure line 34 to the intake side of the compressed air generator 17, which air generator is preloaded in this manner. The compressed air generator 17 increases the pressure of the compressed air that is supplied via the air dryer 21 to the air spring 11. This increasing causes an increase in the pressure that is either permanently preset by the pressure controller 36 according to FIG. 3 or that is, by the pressure controller 36, variably dependent on the pressure of the air spring 11 according to FIG. 5.

The compressed air supply arrangement, particularly the level control arrangement, then operates as follows: by the compressed air generator 17, the at least one air spring 11 can be filled with compressed air by an air dryer 21. The compressed air generator 17 can be connected via a check valve 19, opening in the intake direction of the compressed air generator 17, to the atmosphere. The air spring 11 can be connected to the atmosphere for discharging via the air dryer 21. Pneumatically controllable first directional valve 24 moves with the pressure in the air spring 11 being applied to the pneumatic control input 28 of the first directional valve 24 via a second electrically controllable directional valve 27, against a reset force. The pneumatic control input 28 of the first directional valve 24 can be connected, for ending an discharge process of the air spring 11, via the second directional valve 27 to the atmosphere. In this design concept, compressed air from the supply line 16 of the air spring 11 can be branched via a line 31 with a first changeover valve 32 to compressed air accumulator 33. The compressed air is supplied from the compressed air accumulator 33, via a line 34 connected thereto and a second changeover valve 35, to a line connection 18 between the check valve 19 and the compressed air generator 17 on the intake side of the compressed air generator 17. The pressure of the compressed air is increased by the compressed air generator 17, and the compressed air is then supplied to the air spring 11. The pressure in the line is preset by a preferably pneumatically operating pressure controller. The pressure controller 36 is either permanently adjusted according to FIGS. 1 to 4, or the pressure that is provided by the pressure controller 36 is variably dependent on the system pressure in the supply line 16 of the air spring. This way, the pressure controller 36 is connected for the readjustment action, via a line 37, to the supply line 16 of the air spring 11.

According to FIG. 1, the compressed air generator 17 fills the compressed air accumulator 33 by the intake of air from the atmosphere through the air dryer 21, and with an open first changeover valve 32. When the vehicle body is to be raised by means of air spring 11 via the compressed air accumulator 33, the compressed air that is stored in the compressed air accumulator 33 is supplied, with an open first changeover valve 32 and an open air spring valve 13 of the air spring 11, via the supply line 16, 12.

However, this supply is only possible up to a pressure of, for example, 10 bar, even if the pressure accumulator 33 is pressurized by the compressed air generator 17 typically to 20 bar of air pressure. When the compressed air accumulator 33 has been discharged to a level of approximately 10 bar, the needed operating pressure for the air spring 11 has been reached. After that, any lift action by supplying the air spring 11 is no longer possible. In this case, a residual pressure of 10 bar remains in the compressed air accumulator 33. In this case, advantageously, the vehicle is raised by the compressed air generator 17 that is preloaded to the pressure from the compressed air accumulator 33. With opened air spring valve 13, the second changeover valve 35 is opened, and compressed air is discharged from the compressed air accumulator 33 by second changeover valve 35, as well as the pressure controller 36. This compressed air is supplied, with the check valve 19 closed, via the line 34 to the intake side of the compressed air generator 17.

The compressed air generator 17 then increases the pressure that is either permanently preset by the pressure controller 36, or the pressure of the compressed air that is variably dependent on the pressure of the air spring 11. This air is supplied to the air spring 11.

The pressure controller 36 is only active when the vehicle body is raised by the compressed air generator 17.

The compressed air generator 17 is functional or used only when pressurizing the compressed air accumulator 33 and/or when raising the vehicle body from the state as preloaded via the compressed air accumulator 33.

| No. | Designation |
| --- | --- |
| 10 | Compressed air supply arrangement |
| 11 | Air spring |
| 12 | Pressure line of 11 |
| 13 | 2/2 directional valve of 12 |
| 14 | Control line |
| 15 | Control line |

-continued

| No. | Designation |
| --- | --- |
| 16 | Pressure line of 11 |
| 17 | Compressed air generator |
| 18 | Pressure line of 17 |
| 19 | Check valve in 18 |
| 20 | Pressure line between 17/21 |
| 21 | Air dryer |
| 22 | Branch-off |
| 23 | Pressure line |
| 24 | 2/2 directional valve, pneumatically controllable (1st directional valve) |
| 25 | Branch-off |
| 26 | Pressure line |
| 27 | 3/2 directional valve (2nd directional valve) |
| 28 | Pneumatic control input of 24 |
| 29 | Connection line |
| 30 | Branch-off |
| 31 | Pressure line (compressed air accumulator) |
| 32 | 1st changeover valve (2/2 directional valve) |
| 33 | Compressed air accumulator |
| 34 | Pressure line |
| 35 | 2nd changeover valve (2/2 directional valve) |
| 36 | Pressure controller |
| 37 | Line of 36/16 |

While various embodiments have been chosen to illustrate the invention, it will be understood by those skilled in the art that various changes and modifications can be made therein without departing from the scope of the invention as defined in the appended claims.

What is claimed is:

1. A vehicle level control, comprising:
at least one air spring for cushioning a vehicle body relative to at least one vehicle axle;
a compressed air generator;
an air dryer connecting said air spring and said compressed air generator in fluid communication;
a check valve connecting said compressed air generator to a surrounding atmosphere thereof via an intake line, said check valve opening in an intake direction of said compressed air generator;
a pneumatically controllable first directional valve connecting said air spring to an atmosphere discharge in fluid communication with said air dryer, said first directional valve having a pneumatic control input and a reset device on opposite ends thereof;
an electrically controllable second directional valve connecting said air spring to said pneumatic control input of said first directional valve in fluid communication to convey pressure in said air spring to said pneumatic control input to oppose a reset force of said reset device in a first position of said second directional valve and connecting said pneumatic control input of said first directional control valve to the atmosphere to end discharging of said air spring in a second position of said second directional valve; and
a first line connected to and extending from a supply line of said air spring and connected to a compressed air accumulator via a first changeover valve, said compressed air accumulator being connected in fluid communication via a second line with a second changeover valve therein connected to said intake line extending between said check valve and said compressed air generator.

2. A vehicle level control according to claim 1 wherein said second line contains a pneumatically operating pressure controller.

3. A vehicle level control according to claim 2 wherein said pressure controller is permanently adjusted to a preset value.

4. A vehicle level control according to claim 2 wherein said pressure controller is readjustable relative to system pressure in said supply line of said air spring.

5. A vehicle level control according to claim 4 wherein said pressure controller is connected for readjustment via a line connected to said supply line of said air spring.

6. A vehicle level control according to claim 2 wherein
said second changeover valve is movable from a closed position to an open position thereof to supply compressed air from said compressed air accumulator via said second changeover valve and via said pressure controller with said check valve being closed to an intake side of said compressed air generator; and
said compressed air generator increases the pressure of the compressed air supplied to said compressed air generator to a pressure set by the pressure controller.

7. A vehicle level control according to claim 6 wherein pressure of the compressed air supplied to said compressed air generator is permanently preset by said pressure controller.

8. A vehicle level control according to claim 6 wherein
pressure of the compressed air supplied to said compressed air generator is variably set based on pressure in said supply line of said air spring; and
the compressed air is supplied to said compressed air generator via said air dryer.

9. A vehicle level control according to claim 1 wherein said first changeover valve is connected to said compressed air accumulator and is moveable from a closed position to an open position to pressurize said compressed air accumulator.

10. A vehicle level control according to claim 1 wherein said first changeover valve is connected to said compressed air accumulator and is movable from a closed position to an open position to raise the vehicle body to convey compressed air from said compressed air accumulator to said air spring until at least one of a preset pressure level and a lift level is reached.

11. A method for level control in vehicles equipped with at least one air spring cushioning a vehicle body relative to at least one vehicle axle, comprising the steps of:
filling at least one air spring with a compressed air generated in a compressed air generator via an air dryer,
connecting the compressed air generator to a surrounding atmosphere via a check valve opening in an intake direction of the compressed air generator,
discharging the air spring by connecting the air spring to the surrounding atmosphere via the air dryer and via a pneumatically controllable first directional valve having a pneumatic control input,
subjecting the pressure control input of the first directional valve to pressure in the air spring via an electrically controlled second directional valve against a reset force acting on said first directional valve,
discharging air pressure in the air spring by connecting the pneumatic control input of the first directional valve to the surrounding atmosphere via the second directional valve,
branching off compressed air from a supply line of the air spring via a first line with a first changeover valve to a compressed air accumulator,
supplying compressed air from the compressed air accumulator via a second line connected thereto with a second changeover valve therein to a line connection between the check valve and the compressed air generator on an intake side of the compressed air generator,
increasing pressure of the compressed air supplied to the compressed air generator by the compressed air generator to produce increased air pressure, and
supplying the increased air pressure to the air spring.

12. A method according to claim 11 wherein
pressure in the second line is set by a pneumatically operating pressure controller.

13. A method according to claim 12 wherein
the pressure controller is permanently adjusted.

14. A method according to claim 12 wherein
the pressure controller is variably adjusted dependent on air pressure in the supply line.

15. A method according to claim 14 wherein
the pressure controller is connected to the supply line of the air spring for readjustment via a line.

16. A method according to claim 12 wherein
the second changeover valve is opened to remove compressed air from the compressed air accumulator and to convey that compressed air via the pressure controller,
with the check valve closed, air pressure is supplied to an intake side of the compressed air generator and is then increased in pressure in the compressed air generator and supplied to the air spring to raise the vehicle body by the air spring.

17. A method according to claim 16 wherein
pressure of the compressed air supplied to said compressed air generator is permanently preset by said pressure controller.

18. A method according to claim 16 wherein
pressure of the compressed air supplied to said compressed air generator is variably set based on pressure in said supply line of said air spring; and
the compressed air is supplied to said compressed air generator via said air dryer.

19. A method according to claim 11 wherein
the first changeover valve is opened to fill the compressed air accumulator by the compressed air generator intaking air from the atmosphere.

20. A method according to claim 11 wherein
stored compressed air accumulated in the compressed air accumulator is supplied by opening the first changeover valve to the air spring via the supply line for the air spring to raise the vehicle body by the air spring.

21. A method according to claim 11 wherein
the pressure controller is only acting for raising the vehicle body by the compressed air generator.

22. A method according to claim 11 wherein
the compressed air generator is only functional for at least one of charging the compressed air accumulator and raising the vehicle body as preloaded by the compressed air accumulator.

* * * * *